TUBE DRIVING APPARATUS

Original Filed Dec. 18, 1967

United States Patent Office

Re. 28,151
Reissued Sept. 10, 1974

28,151
TUBE DRIVING APPARATUS

Paul M. Cook, 835 W. 7th Ave., Vancouver, British Columbia, Canada

Original No. 3,474,870, dated Oct. 28, 1969, Ser. No. 691,464, Dec. 18, 1967. Application for reissue Oct. 26, 1971, Ser. No. 192,269
Int. Cl. B25d *9/04, 11/04, 13/00*
U.S. Cl. 173—91 14 Claims

Matter enclosed in heavy brackets [ ] appears in the original patent but forms no part of this reissue specification; matter printed in italics indicates the additions made by reissue.

ABSTRACT OF THE DISCLOSURE

An apparatus having a frame in which a tubular ram is mounted to be reciprocated into driving engagement with a laterally projecting part of a driven member extending coaxially through the ram.

BACKGROUND OF THE INVENTION

This invention relates to apparatus which is particularly intended for use in driving open ended tubes into the ground.

There are a number of tube-like members which are required to be hammered into the ground and included amongst these are hollow cylindrical piles of various cross sectional shapes which are used to provide foundations for buildings and other structures. Pipe is often driven into drill holes to reinforce the sides of the hole and prevent collapse which would interfere with the action of the drill. A drilled well generally is required to be lined when the ground is such that the hole will not stay open by itself or cannot be kept open by pumping clean-out fluid therethrough.

All such tubes are driven into the ground with their lower ends open whenever possible since and end closure considerably increases the driving force which is required. However, when the lower end of the tube is left open, it is necessary to remove the plug of soil which builds up in the tube end, otherwise the speed of penetration is reduced and increased driving power is needed. There are several methods of removing the soil plug but each method requires free access to the top of the tube to permit entry of clean-out fluid or mechanical devices such as bailers, grab buckets and the like.

When drilling a well, for example, the hole is reinforced by a casing formed of suitable lengths of pipe, the pipe normally being connected together by external flanges. The hollow drill rod and bit remain in the ground as the hole is lined with the casing to enclose the drill rod. At the same time, a suitable conveying or clean-out material such as water, air or mud, is circulated down through the hollow drill rod and up between the rod and casing to remove any soil which might be plugging the lower end of the casing.

Attempts have been made to adapt pile driving hammers for driving well casing but conventional power hammers are not suitable for this particular purpose. One reason such hammers have been found unsuitable, is that they are designed to strike blows on the upper end of a pile. When used on well casing, this means the drill rod must be removed and the upper end of the basing be fitted with a cap or the like to receive the blows of the hammer. This interferes with the cleaning out operation which makes it more difficult and time consuming to drill a well and line the hole with reinforcing pipe. In addition the blows must be delivered on the upper end of the casing by a pile driving hammer which makes it necessary to support the hammer in vertical guides carried by a frame which extends some distance above the top of the casing.

SUMMARY OF THE INVENTION

The present apparatus includes a tubular impacting ram which fits around *a hollow central member that overlies* the tube, *pipe casing, hollow pile or other such hollow driven tube*, or around a flanged extension temporarily secured to the upper end of the tube, and is arranged to deliver blows to the tube near ground level, while maintaining free access to the interior of the tube for clean-out of soil by any desired means, the two operations being permitted to take place simultaneously. This feature of permitting simultaneous driving and clean-out of the tube makes the driving force more effective, thus speeding the operation of drilling the hole and installing the tube. When the apparatus is in driving position, some of the parts serve as bearings which engage the tube or flanged extension thereto, and align the driving ram. By use of the apparatus, the tube can quickly and easily be driven into the ground; and by simply repositioning the apparatus longitudinally on the tube, or flanged extension thereto, blows can be delivered which will drive the tube out of the ground should removal of the tube ever be necessary. The blows struck by the driving ram are transmitted through anvils so that the casing receives substantially the full force of the blow and little power is wasted. In addition, the apparatus is of extremely rugged and simple construction to withstand the rough usage to which such equipment is often subjected.

DESCRIPTION OF THE PREFERRED EMBODIMENT

Figure 1:
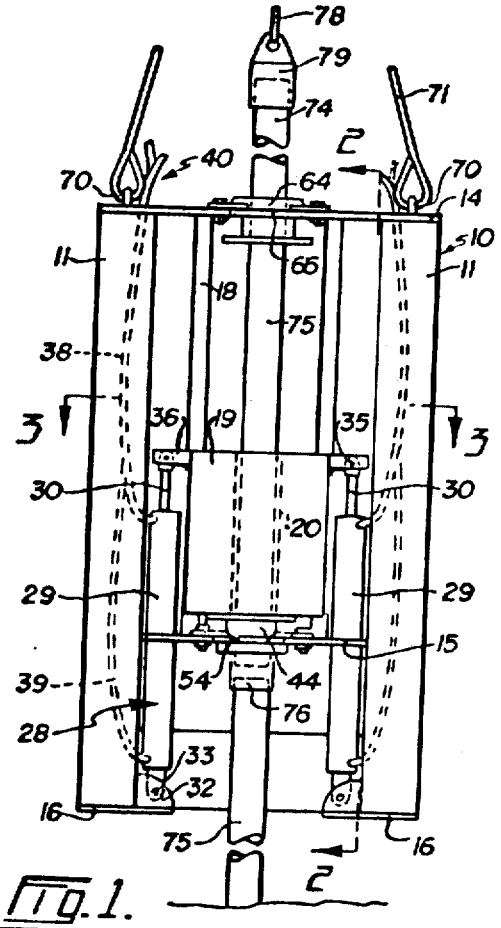
FIGURE 1 is a front elevation of the invention.

The present apparatus comprises a vertically elongated frame 10 having side members 11, these heavy channel-like members preferably being connected together near their lower ends by a rear cross bar 12. Secured to the top ends of the frame side members 11, is a horizontal plate 14. Near the lower end of the frame 10, a horizontal plate 15 is carried between the members 11. Plate 15 is spaced a short distance above bottom flanges 16 which project inwardly from the lower edges of the side members 11.

Figure 2:
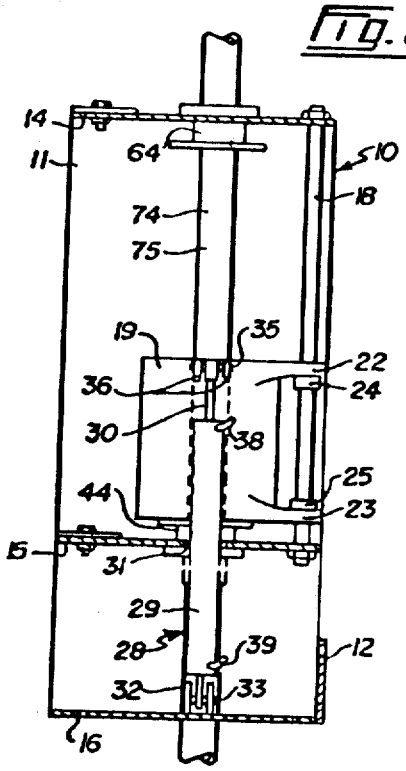
FIGURE 2 is a section taken on the line 2—2 of FIGURE 1.

End plates 14 and 15 are connected by a pair of guide rods 18, these vertical rods being located near the rear of the frame 10. Mounted on the spaced rods 18, is a cylindrical driving ram 19 having a through bore 20. As shown in FIGURE 2, the tubular ram 19 is provided with rearwardly projecting top and bottom flanges 22 and 23, these flanges being fitted at their corners with opposing pairs of bearings 24 and 25. The pair of guide rods 18 extend through the pairs of bearings 24 and 25 so as to support the ram 19 for vertical sliding movement within the frame 10.

Figure 3:
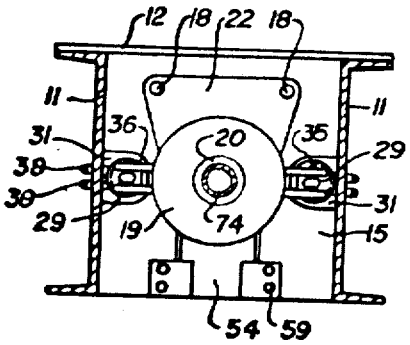
FIGURE 3 is a section taken on the line 3—3 of FIGURE 1.

Ram 19 is adapted to be reciprocated on the rod 18 by suitable drive means indicated generally at 28. The drive means 28 illustrated comprises two double acting air cylinders 29 having piston rods 30. Openings 31, see FIGURE 3, are formed in the end plate 15 and the cylinders 29 extend freely through these openings. Pairs of spaced lugs 32 are carried by the bottom flanges 16 and pins 33 secure the lower ends of the cylinders 29 to these lugs. The upper ends of the piston rods 30 are secured by pins 35 to brackets 36 which project laterally from the sides of the ram near the upper edge thereof. The opposite ends of the cylinders 29 are fitted with air hoses 38 and 39, these hoses being included in a pneumatic circuit which is generally indicated by the numeral 40.

Figure 4:
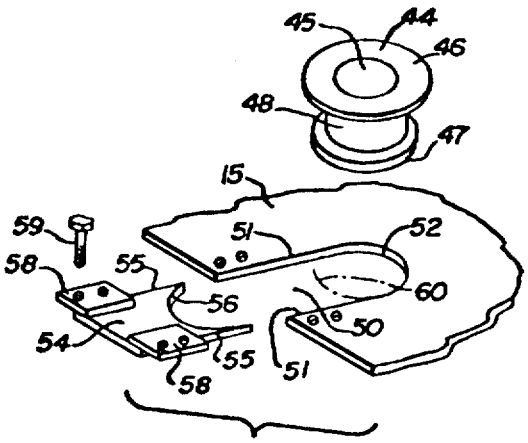
FIGURE 4 is an exploded perspective view of the bottom anvil and associated parts.

Referring now particularly to FIGURE 4, the numeral 44 indicates an annular anvil which is a disc-like member of hardened metal having a bore 45 and spaced flanges 46 and 47 which define a side channel 48. End plate 15 has a slot 50 which extends inwardly from the front of the frame 10, the slot having parallel side edges 51 and a semi-circular rear edge 52. Anvil 44 is supported within the slot 50 and is locked therein by means of a keeper 54. This keeper is a flat metal bar having parallel side edges 55 and a semi-circular inner edge 56. Keeper 54 is fitted with lugs 58 which project outwardly over the side edges 55. Screws or other suitable fasteners 59 secure the lugs 58 of the keeper to the plate 15. When the keeper is mounted on plate 15 as described and illustrated, the edges 52 and 56 provide a circular opening 60 in which the anvil 44 is lodged with the peripheral edge of said opening being received in the side channel 48. Thus, the anvil is mounted for limited endwise movement, the vertical travel of the anvil relative to plate 15 being determined by the width of the channel 48.

As shown in FIGURES 1 and 2, a similarly constructed anvil 64 is supported in the same manner on the end plate 14. Another keeper 65, of the same construction as before, secures the top anvil 64 to plate 14.

End plate 14 has two spaced lugs 70 which project upwardly, near the side members 11, along the center of the frame 10. Secured to the lugs 70 is a double ended line 71 which extends upwardly to a suitable hoisting mechanism, not shown. Preferably, line 71 is wound around a winch on the drilling machine so that the apparatus can be raised and lowered as required along with other equipment and the like normally hoisted by such a machine.

The drilling machine referred to is a type used to drill wells and the like, the drill hole being lined with a casing 74, see FIGURE 1. This casing is made up of lengths of pipe *or other hollow central member* 75 which are connected together by external couplings 76. Casing 74 is driven into the hole as drilling progresses and the soil entering the bottom of the casing is removed to prevent plugging. Normally, this is done by pumping air, water or mud through the hollow drill rod to the bottom of the hole so that it will travel upwardly through the casing carrying the loose dirt with it for discharge clear of the hole.

In the operation of the present apparatus, the frame 10 is lowered over the uppermost length of pipe 75 which projects above the surface of the ground. A pipe is entered through the bottom anvil 44, the bore 20 of the tubular ram 19, and through the top anvil 64, the frame being lowered until the apparatus comes to rest with the flange 47 of the bottom anvil in contact with the top edge of an outer coupling 76. It will be noted, the inner diameters of the two anvils are such as to closely fit the casing 74. Thus, the anvils 44 and 64 serve as bearings which support the frame 10 on the casing with a slight clearance being provided between the surface of the ram bore 20 and the outer periphery of the pipe.

The pneumatic circuit 40 includes a suitable control valve or the like (not shown) which is operated automatically to reciprocate the ram whenever a master control (not shown) is turned on manually. The automatically operated valve is such as to cause the ram 19 to move through a power stroke and a return stroke of desired length with the valve providing an air cushion for the ram as it approaches the end of its return stroke. With almost the entire weight of the apparatus resting on the coupling, the ram 19 is driven to strike the coupling a series of rapid blows which drives the pipe into the ground.

Should it be necessary to withdraw the casing 74 from the ground, this can be done by positioning the apparatus so that the top anvil 64 bears against the underside of a coupling 76. Slight tension is maintained on the line 71 and, at the same time, a pull is exerted on the casing by means of another line 78 which is secured to the top of the casing as at 79. The ram is then operated to hammer the underside of the coupling which will drive the casing out of the ground while, at the same time, the casing is pulled upwardly by means of the line 78.

From the foregoing, it will be apparent the apparatus will serve equally as well in the driving of tubular piles or pipe of any kind and may also be used to drive solid rods or posts. Many of the hollow driven members, which are referred to herein as tubes, can readily be provided with outer projections to receive the blows of the ram in the same manner as the couplings on a well casing. A number of types of collars are available for this purpose and, if it is not convenient to fit such a collar, the upper end of the tube can be fitted with a suitable flanged extension to take the force of the blows and transmit them to the tube. As long as the piling, pipe or casing has, or can temporarily be fitted with, a suitable collar, the apparatus will function as described.

I claim:

1. Apparatus for driving a tube having a collar endwise into the ground and comprising a vertically elongated frame, a transversely extending plate near each end of the frame, an annular anvil supported by each end plate for limited vertical movement therein, a tubular ram, guide means supporting the ram for reciprocation between the anvils, said frame being adapted to be supported with the tube projecting through the anvils and the ram and with one of said anvils in contact with the collar, and means for reciprocating the ram to impact said one anvil against the collar.

2. Apparatus as claimed in claim 1, in which said guide means is a pair of spaced guide rods extending longitudinally of the frame, said ram having outer bearings slidably engaging the pair of guide rods.

3. Apparatus as claimed in claim 1, in which said anvils have inner bearing surfaces closely fitting the tube whereby to support the ram out of contact with said tube.

4. Apparatus as claimed in claim 3, in which said end plates have aligned openings provided with peripheral edges, said anvils having side channels slidably received in the peripheral edges.

5. Apparatus as claimed in claim 4, in which said peripheral edges are partly formed in keepers removably secured to the end plates.

6. Apparatus as claimed in claim 1, in which said reciprocating means for the ram includes a fluid operated cylinder and piston rod therefor.

7. Apparatus as claimed in claim 6, in which said ram has a laterally projecting bracket at one end thereof, said fluid operated cylinder and piston rod being operatively connected to the bracket and the frame.

8. Apparatus for driving a tube having a collar endwise into the ground and comprising a frame, a tubular ram mounted for reciprocation within the frame, said frame being adapted to being supported with the tube extending coaxially through the ram, an annular anvil supported by the frame to encircle the tube between the ram and the collar, and means for reciprocating the ram to deliver a rapid series of blows against the anvil and the collar and drive the tube in one direction.

9. Apparatus as claimed in claim 8, and including an end plate in the frame, said annular anvil being supported by the end plate for limited endwise movement relative thereto when impacted by the ram against the collar.

10. Apparatus as claimed in claim 8, and including guide means on the frame for the ram.

*11. Apparatus for driving a hollow driven tube endwise into the ground and allowing the driven tube to be cleaned out while being driven, comprising a hollow cen-*

*tral member to accommodate drill rod for passing drilling fluid or the like therethrough, a ram surrounding said central member, means for guiding the ram for vertical reciprocation along said central member, means externally of said hollow central member for reciprocating the ram so that drill rod may be positioned in said hollow central member, means for aligning the lower end of said central member with said driven tube, and means for receiving impact forces from said ram and transmitting the impact forces to said driven tube for driving the driven tube into the ground.*

*12. Apparatus as claimed in claim 11, including a vertically elongated frame, a transversely extending plate near each end of the frame, upper and lower anvils supported by each end plate respectively for limited vertical movement therein, said frame being adapted to be supported with the central member projecting through the anvils, said means for receiving impact forces and transmitting them to said driven tube including said lower anvil.*

*13. Apparatus for driving a driven tube endwise into the ground and comprising a frame, a tubular ram mounted for reciprocation within the frame, said frame being adapted to be supported with the driven tube aligned coaxially with the ram, means engaging the driven tube for receiving impact blows for driving the driven tube into the ground, an anvil supported by the frame below the ram for transmitting impact blows from the ram to said means for receiving impact blows, and means for reciprocating the ram to deliver a rapid series of blows against the anvil.*

*14. Apparatus as claimed in claim 11, said means for receiving impact forces and transmitting them to said driven tube including a collar secured to said driven tube.*

References Cited

The following references, cited by the Examiner, are of record in the patented file of this patent or the original patent.

UNITED STATES PATENTS

| | | | |
|---|---|---|---|
| 3,135,340 | 6/1964 | Robinsky | 173—84 |
| 52,799 | 2/1866 | Winter | 173—90 |
| 2,833,120 | 5/1958 | Barrett et al. | 173—89 |
| 3,015,365 | 2/1962 | Griffin et al. | 173—129 |
| 3,135,340 | 6/1964 | Robinsky | 173—84 |

FOREIGN PATENTS

| | | |
|---|---|---|
| 632,935 | 12/1969 | Great Britain. |
| 945,440 | 12/1963 | Great Britain. |

JAMES A. LEPPINK, Primary Examiner

U.S. Cl. X.R.

173—129, 132